Figure 1:
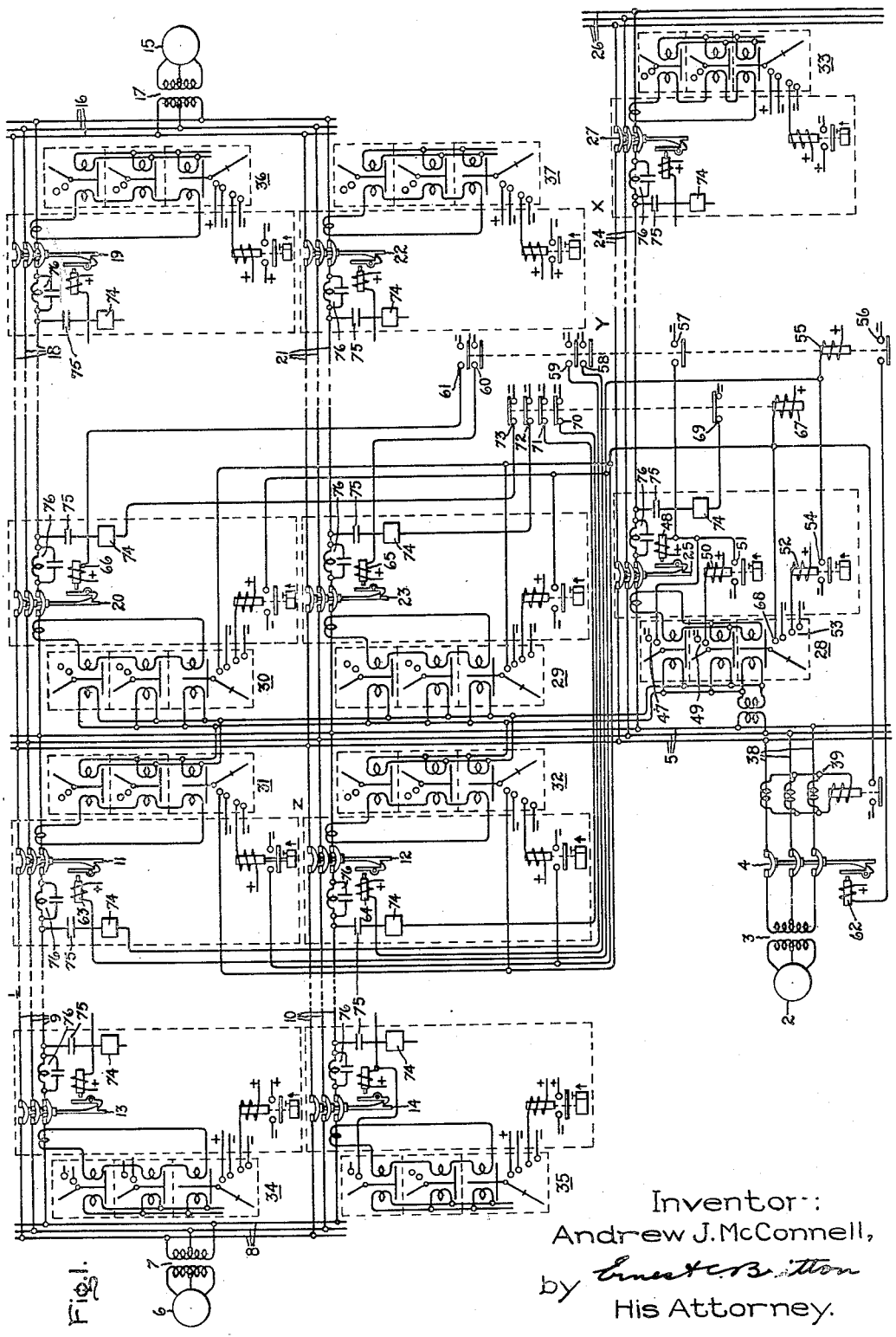

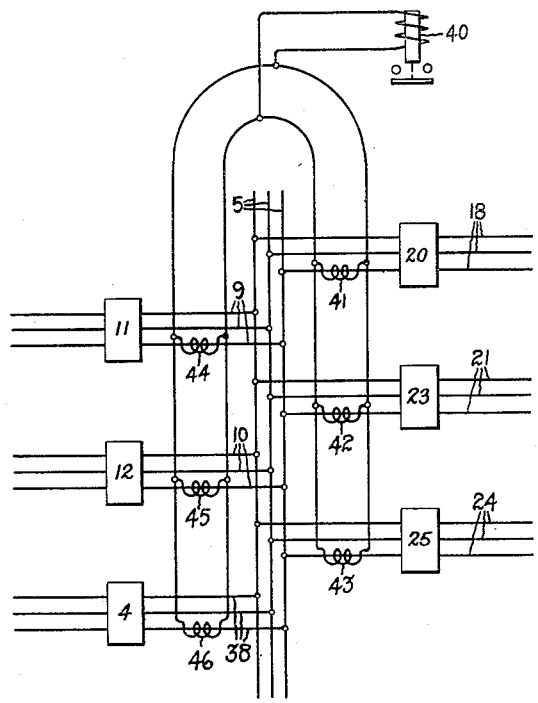

Patented Apr. 10, 1951

2,548,612

UNITED STATES PATENT OFFICE 2,548,612

SYSTEM OF BACKUP PROTECTION AND CARRIER-CURRENT BLOCKING FOR AN ELECTRICAL POWER SYSTEM

Andrew J. McConnell, Delmar, N. Y., assignor to General Electric Company, a corporation of New York Application February 25, 1949, Serial No. 78,386

6 Claims. (Cl. 175—294)

1

This invention relates to electrical relay systems and more particularly to a relay system providing backup protection and carrier-current relay blocking on an electrical network system.

In complicated network systems wherein several power sources are remotely located one from the other and electrically interconnected by electrical busses and electrical transmission lines, the problem of relay protection becomes intricate and the multiplicity of relays presents a problem in operating, maintenance, and replacement of electrical units.

It is therefore desirable in such an electrical system to accomplish the maximum number of required functions with the minimum number of electrical units.

It is an object of this invention to reduce, with respect to a particular network system presenting a particular relay protection problem, the number of electrical units necessary to solve that problem satisfactorily.

My invention in general comprises a system of backup protection and carrier-current relay blocking providing proper protection for an electrical network system wherein an electrical transmission line, which is a power source, is connected to an electrical bus to which is also connected at least one other transmission line and at least one other power source.

For a complete understanding of my invention, reference should be had to the following specification and the accompanying drawing wherein Fig. 1 is a diagrammatic view of an electrical network system showing the application of my invention thereto and Fig. 2 is a diagrammatic view of a bus differential circuit used to explain a modification of my invention.

Referring to Fig. 1, I have shown for the purpose of illustrating my invention an electrical network system 1. In network system 1 a generator 2 is electrically connected through a transformer 3 and a circuit breaker 4 to an electrical bus 5. An electrical generator 6 is electrically connected through a transformer 7 to an electrical bus 8. Two electrical transmission lines 9 and 10 are electrically connected through respective circuit breakers 11 and 12 to electrical bus 5. The other end of transmission line 9 is electrically connected through a circuit breaker 13 to electrical bus 8, and the other end of transmission line 10 is electrically connected through a circuit breaker 14 to electrical bus 8. An electrical generator 15 is electrically connected to an electrical bus 16 through a transformer 17. An electrical transmission line 18

2 is electrically connected to electrical bus 16 through a circuit breaker 19 and to electrical bus 5 through a circuit breaker 20. An electrical transmission line 21 is connected to electrical bus 16 through a circuit breaker 22 and to electrical bus 5 through a circuit breaker 23. An electrical transmission line 24 is electrically connected to electrical bus 5 through a circuit breaker 25 and to an electrical bus 26 through circuit breaker 27. The length of each of transmission lines 9, 10, 18 and 21 is assumed to be 25 miles. The length of transmission line 24 is assumed to be 150 miles. Short-circuit currents of 100 amperes are assumed to flow in each of the transmission lines 9, 10, 18 and 21 into electrical bus 5 and thence into transmission line 24 to an electrical fault at X near electrical bus 26. Also, a current of 100 amperes is assumed to flow from generator 2 into bus 5 and into transmission line 24 to the fault at X. Thus, a total current of 500 amperes is assumed to flow from bus 5 to the fault at X through transmission line 24. The impedance in each of the transmission lines 9, 10, 18 and 21 is assumed to be 20 ohms and the impedance of transmission line 24 is assumed to be 120 ohms. The voltage at electrical bus 5 is therefore 60,000 volts, that is 500 times 120, phase to neutral, and the voltage at electrical busses 8 and 16 is 62,000 volts or 60,000 plus 100×20, phase to neutral.

To protect such a network system in a conventional manner, distance relays 28 through 37 inclusive are connected in network 1 as shown in Fig. 1, each distance relay having a first, second and third zone unit. Such a distance relay has the characteristic of operating in response to the ratio of voltage divided by the current of the transmission line in which the particular relay is connected or in response to a function of that ratio. In each distance relay the first zone unit provides instantaneous tripping of the circuit breaker connected to that relay for a fault occurring on the transmission line to which the relay is connected and within a certain distance from that relay, generally including 80% to 90% of the line. The second zone unit of that particular relay functions, after a time delay, for a fault in the transmission line to which the relay is connected in a zone which extends from the end of the first zone to some point farther distant from the relay, generally to a point beyond the next electrical bus. The third zone unit of the particular distance relay in question operates, after a further time delay, to trip the breaker to which the relay is connected for a fault beyond the second zone.

For example, the first zone unit of relay 35 trips circuit breaker 14 instantaneously for a fault on transmission line 10 within the limits of zone 1 which might extend 90% of the distance to electrical bus 5. For a fault in zone 2 of transmission line 10 the second zone unit of relay 35 trips circuit breaker 14, after a time delay, for faults in the portion of line 10 not included in zone 1 and for faults near bus 5 in other lines such as 9, 18, 21 and 24 connected to electrical bus 5. For a fault still more distant, the third zone unit of relay 35 operates to trip circuit breaker 14 after a further time delay. Zone 3 ideally includes all of any other transmission lines, such as 9, 18, 21 and 24, connected to bus 5. The object of the time delay characteristic in the second and third zone units of each distance relay is to permit the circuit breaker nearest the fault to operate first. This circuit breaker failing to operate, back-up protection is provided by having the next nearest circuit breaker operate to remove the fault. In this manner the disrupting effect on the network system in general is limited, as nearly as possible, to the particular area at fault. For example, assuming an electrical fault in the zone 2 operating range of relay 28 of transmission line 24, as at X, relay 28 should operate through the medium of its zone 2 unit to trip circuit breaker 25. However, should the relay 28 fail to operate for some reason, zone 3 units of distance relays 34, 35, 36 and 37 should ideally operate to trip circuit breakers 13, 14, 19 and 22. Assuming a relay also available to open circuit breaker 4 on bus 5, all sources of short-circuit current are disconnected from the fault. Considering circuit breaker 14 as an example, we should expect relay 35 through its third zone unit to recognize the fault in the second zone range of relay 28 of transmission line 24 and to act thereupon to trip circuit breaker 14 in the event of failure of circuit breaker 25 to trip in the zone 2 time of relay 28. However, considering the fact that relay 35, being a distance relay, is responsive to the ratio of voltage divided by current flowing in transmission line 10, it is seen this ratio is 62,000 divided by 100 or 620 ohms. Comparing this ratio with the ratio of voltage divided by current for relay 28, it is seen that for relay 28 the ratio of voltage to current in transmission line 24, which ratio is applied to relay 28, is 60,000 divided by 500 or 120 ohms. Therefore, although relays 28 and 35 are actually only 20 ohms apart, the apparent impedance at relay 35 is 500 ohms greater, that is, 620 minus 120, than the apparent ohms at relay 28. This indicates that the apparent impedance at relay 35, which is 620 ohms, is 480 ohms more than the actual ohms to the fault which is 120 plus 20 or 140 ohms.

To avoid operation on normal load current under conditions as outlined above, it may not be practical to set the third zone unit of relay 35 to be responsive to an electrical fault in the second zone range of relay 28 of electrical transmission line 24. By the same line of reasoning, relays 34, 36 and 37 also may not recognize the fault at X. Therefore, this manner of disconnecting circuit breakers 13, 14, 19 and 22 may not be feasible.

A second conventional method of disconnecting transmission lines 9, 10, 18 and 21 in the event of failure of circuit breaker 25 to open for a fault on transmission line 24 at X is to open circuit breakers 11, 12, 20 and 23 respectively by means of zone 3 units of relays 31, 32, 30 and 29 rather than to open circuit breaker 13, 14, 19 and 22 by means of zone 3 units of relays 34, 35, 36 and 37. For example, the zone 3 unit of relay 32 could be used to open circuit breaker 12 instead of the aforementioned third zone of relay 35 opening circuit breaker 14. However, this procedure results in a reduction of only 20 ohms impedance since the apparent impedance at the location of relay 32 is 60,000 divided by 100 or 600 ohms.

Since both of the aforementioned third-zone backup means can fail because of excessive apparent impedance at the relay location, a third conventional method may be applied which method will now be considered. In this connection it will be noted that the second zone unit of relay 28 should have tripped breaker 25 for a fault in zone 2 of transmission line 24. Since breaker 25 did not trip, it is likely that the cause of failure is external to relay 28. If so, circuit breaker 25 will also not trip through the medium of the third zone unit of relay 28. Therefore, the additional time afforded by the third zone unit of relay 28 would not aid in tripping circuit breaker 25.

As a third conventional method of tripping the necessary circuit breakers, the third zone unit of relay 28 may be connected to trip circuit breakers 4, 11, 12, 20 and 23. In practice, the third zone unit of relay 28 would be connected to trip breaker 25 also, even though it had previously failed to trip. Thus, the third zone units of relays 28 through 32 would all be connected to trip all of the circuit breakers connected to bus 5. This third conventional method is highly advantageous relative to the first and second conventional methods because the zone 3 unit of relay 28 is electrically much nearer the fault than are the zone 3 units of relays 29, 30, 31 and 32 or the third zone units of relays 34, 35, 36 and 37. That is, relay 28 is electrically 120 ohms from the fault and relays 29 to 32, inclusive, and 34 to 37, inclusive, are respectively 600 ohms and 620 ohms from the fault.

These same distance relays can be used in a carrier-current system to avoid time delay tripping for faults in the second zone of another distance relay. For example, assuming an electrical fault at point Y on transmission line 24 in the second zone of relay 33, then with distance relay 33 alone operating circuit breaker 27, operation of that relay will be delayed because the fault is in its second zone of operation. On the other hand, if the second zone were instantaneous in operation, the second zone unit could not distinguish between the fault at Y and a fault at Z on transmission line 10 because Y and Z are approximately equidistant from relay 33. Relay 33 would therefore operate instantaneously for a fault at Z if it were able to do so for a fault at Y and circuit breaker 27 would be unnecessarily tripped.

The conventional method of preventing circuit breaker 27 from operating for a fault at Z is to initiate the transmission of carrier-current blocking signal at the location of relay 28, the blocking signal being received by relay 33 and used to prevent relay 33 from tripping instantaneously. If the third zone unit actually consists of two units, a non-directional distance unit and a directional unit, the non-directional distance unit can be used to initiate the transmission of the carrier blocking signal. However, if the third zone unit is directional or substantially so, as is often desirable, and operates in accordance with the third conventional back-up means described above, a fourth unit would have to be added to relay 28, this unit initiating the transmission of a carrier-current blocking signal from relay 28 to relay 33 to prevent instantaneous operation of the latter. The third zone unit would be used as a backup protection tripping the remaining circuit breakers around bus 5 in the event that circuit breaker 25 failed to operate for a fault at X on transmission line 24, and the fourth unit would be used to accomplish the blocking of relay 33 in the event of a fault such as at Z on transmission line 11.

In accordance with my invention both of the functions just mentioned may be accomplished with a three zone relay, thus eliminating the fourth unit. To do this, I use the third zone element of each distance relay connected in each transmission line to initiate a carrier-current blocking signal in each of the remaining lines having carrier-current relaying. For example, I use the third zone unit of relay 32 to start a blocking carrier signal in transmission line 24 and in any other transmission lines having carrier relaying, such as transmission lines 9, 18 and 21, for a fault at Z. Similarly, for a fault on transmission line 9, the third zone unit of relay 31 starts carrier-current blocking signals on lines 10, 18, 21 and 24, and so on. Thus, relay 33 is prevented from tripping circuit breaker 27 for faults on transmission lines 9, 10, 18 and 21, and relays 34, 35, 36 and 37 are prevented from tripping their respective circuit breakers for faults not on their respective lines.

Alternatively, and preferably, I use the third zone element of each distance relay connected in each transmission line to initiate a blocking carrier signal in all lines having carrier-current relaying. Thus, for a fault at Y, the third zone unit of relay 28 not only starts carrier blocking signals in all other carrier relayed lines, but in line 24 as well. This is permissible since the zone 2 element conventionally is connected to prevent the continued transmission of the carrier blocking signal for a fault in its protected direction. Thus, although the third zone unit of relay 28 initiates the transmission of a carrier blocking signal over line 24 for a fault at Y, the second zone unit of the same relay stops such transmission, thereby permitting relay 33 to trip circuit breaker 27 instantaneously.

It has been assumed so far that all the transmission lines have three zone distance relays. In the event that one of the transmission lines, or other electrical circuit such as 38, does not have a relay having a third zone unit, then any applicable fault detection means could be used on each circuit singly or in groups to initiate the transmission of a carrier-current blocking signal on the carrier-relayed lines. For example, relay 39 is an instantaneous overcurrent relay which starts carrier blocking signals on the carrier-current relayed lines for electrical faults between generator 2 and relay 39. As a further example, if relay 29 were not a three-zone distance relay, several types of relays might be used, the simplest being an instantaneous overcurrent relay, if applicable. Alternatively, a relay like the third zone unit of the three-zone distance relay may be used. As a further example, if neither relay 29 nor relay 30 were a three-zone distance relay, it would be possible, in most cases, to use a single relay energized by a derivative of the sum of the currents of the two transmission lines 18 and 21 to initiate the transmission of a carrier-current blocking signal on the carrier-relayed lines.

In the event of a fault on electrical bus 5, many third zone units of distance relays can be arranged to include the electrical bus in their zones of operation and thereby provide the protection necessary. However, if the particular third zone units used could not include the bus, an instantaneous bus differential relay may be used to initiate carrier-current blocking on all carrier relayed transmission lines. For example, Fig. 2 represents an instantaneous overcurrent relay 40 connected conventionally as a bus-differential relay to current transformers 41 to 46 inclusive, in transmission lines 18, 21, 24, 9 and 10 and power source lines 38. An electrical fault on bus 5 causes the operation of relay 40, which in turn can be connected to initiate the transmission of carrier-current blocking signals on the carrier-relayed lines in the same manner that relay 39 is connected in Fig. 1.

To illustrate the operation of each distance relay in detail attention is directed to relay 28 as an example. Considering relay 28, a fault such as Y on transmission line 24 would be recognized by the first zone unit of relay 28 and contacts 47 would close instantaneously thereby energizing trip coil 48 which trips circuit breaker 25. For a fault in the second zone of relay 28, such as a fault at X, the second zone unit of relay 28 closes its contacts 49 which contacts energize a time delay auxiliary relay 50 closing its contacts 51 after a time delay and thereby energizing trip coil 48 to trip circuit breaker 25. In the event that circuit breaker 25 does not trip for a fault at X by operation of the second zone unit of relay 28 then the trouble may be external to relay 28 and operation of the third zone unit of relay 28, which ordinarily would provide a further time delay, may not trip circuit breaker 25. Therefore, the third zone unit of relay 28 is used to energize a time delay relay 52 by closing contacts 53 of the third zone unit of relay 28. The time delay relay 52 when energized closes its contacts 54, after a time delay, and thereby energizes an auxiliary relay 55. Relay 55 has several normally open contacts 56 to 61, inclusive, which when closed by excitation of relay 55 respectively energize trip coils 62, 48, 63, 64, 65 and 66 thereby tripping respective circuit breakers 4, 25, 11, 12, 23 and 20. Circuit breakers 4, 11, 12, 23 and 20, when tripped, disconnect all power sources from bus 5, and even though circuit breaker 25 has failed to trip, short-circuit current is prevented from flowing through transmission line 24 to the fault at X.

In addition to the backup protection of breaker 25, the third zone unit of relay 28 also energizes an auxiliary relay 67 by closing an additional set of contacts 68 located in the third zone unit of relay 28. Relay 67 when energized opens its normally closed contacts 69 to 73, inclusive, to initiate blocking carrier-current signals on all carrier-current relayed transmission lines. Thus, for a fault at Y, carrier-current blocking signals would be transmitted over lines 9, 10, 18 and 21 to prevent operation of relays 34, 35, 36 and 37, respectively. Although a carrier-current blocking signal is also transmitted over the faulted line 24, such transmission is stopped, by conventional means, by the operation of the second zone unit of relay 28.

The boxes 74 represent the carrier-current transmitter-receiver sets connected to each carrier-current transmission line through capacitors 75 and the units 76 represent the line traps associated with each carrier-current transmission system.

Although I have described the use of the third zone unit of each distance relay as a means for initiating a carrier-current signal in the various carrier-current transmission lines, it will be obvious to those skilled in the art that, since the first and second zone units of the distance relays also look in the same direction as the third zone units, either the first, or second zone units may alternately be used instead of the third zone units to start the carrier-current transmission.

Therefore, in my invention, I provide an arrangement of backup protection and carrier-current relay blocking providing proper protection of an electrical network system comprising a bus bar, two electrical transmission lines connected to the bus bar, one of the transmission lines being connected to a power source, and at least one other power source connected to the bus bar, and in which arrangement both the function of backup protection and carrier-current relay blocking are accomplished by a single relay unit in each circuit thus eliminating the necessity of an additional unit in each circuit to perform one or the other of the functions mentioned.

While I have shown and described particular embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In an electrical system having an electrical bus, at least three transmission lines connected to said bus each through an electrical interrupter, at least two of said transmission lines being carrier current relayed lines connected each to a power source, at least one of said transmission lines being a non-carrier current relayed line connected to an additional power source, backup and carrier blocking protection for said power system comprising a three zone distance relay for each of said carrier current relayed lines, each of said distance relays having a substantially directional third zone unit, contact means on said third zone unit of each of said distance relays, additional relay means on said non-carrier current relayed transmission line, contact means on said additional relay means, a control circuit means electrically connected to each of said contact means, and connections for electrically connecting said control circuit means to a source of control current to initiate in response to operation of any one of said relays for predetermined electrical fault conditions on said power system the transmission of carrier current signal in all carrier current relayed lines except the line to which that particular relay is connected.

2. In an electrical system having an electrical bus, at least three transmission lines connected to said bus each through an electrical interrupter, at least two of said transmission lines being carrier current relayed lines connected each to a power source, at least one of said transmission lines being a non-carrier current relayed line connected to an additional power source, backup and carrier blocking protection for said power system comprising a three zone distance relay for each of said carrier current relayed lines, each of said distance relays having a substantially directional third zone unit, contact means on said third zone unit of each of said distance relays, additional relay means on said non-carrier current relayed transmission line, contact means on said additional relay means, an auxiliary relay means electrically connected to said contact means of said distance relays and said additional relay means and connections for electrically connecting the operational winding of said auxiliary relay means through said contact means to a source of control current, a plurality of additional contact means on said auxiliary relay and connections for connecting each of said carrier current systems through an associated one of said additional contact means to a source of control current to initiate in response to operation of any one of said relays for predetermined electrical fault conditions on said power system the transmission of carrier current signal in all carrier current relayed lines except the line to which that particular relay is connected.

3. In an electrical system having an electrical bus, at least three transmission lines connected to said bus each through an electrical interrupter, at least two of said transmission lines being carrier current relayed lines connected each to a power source, at least one of said transmission lines being a non-carrier current relayed line connected to an additional power source, backup and carrier blocking protection for said power system comprising a three zone distance relay for each of said carrier current relayed lines, each of said distance relays having a substantially directional third zone unit, contact means on said third zone unit of each of said distance relays, additional relay means on said non-carrier current relayed transmission line, contact means on said additional relay means, a control circuit means electrically connected to each of said contact means and connections for electrically connecting said control circuit means to a source of control current to initiate in response to operation of any one of said relays for predetermined electrical fault conditions on said power system the transmission of carrier current signal in all carrier current relayed lines.

4. In an electrical system having an electrical bus, at least two carrier current relayed transmission lines connected to said bus each through an electrical interrupter, each of said transmission lines being connected to a power source, and at least one additional power source connected to said bus through an electrical interrupter, additional relay means for said additional power source, contacting means on said additional relay means backup and carrier blocking protection for said power system comprising a three zone distance relay for each of said carrier current relayed lines, each of said distance relays having a substantially directional third zone unit, contact means on said third zone unit of each of said distance relays, a control circuit means electrically connected to each of said contact means and connections for electrically connecting said control circuit means to a source of control current to initiate in response to operation of any one of said relays for predetermined electrical fault conditions on said power system the transmission of carrier current signal in all carrier current relayed lines except the line to which that particular relay is connected.

5. In an electrical system having an electrical bus, at least two carrier current relayed transmission lines connected to said bus each through an electrical interrupter, each of said transmission lines being connected to a power source, and at least one additional power source connected to said bus through an electrical interrupter, additional relay means for said additional power source, contact means on said additional relay means backup and carrier blocking protection for said power system comprising a three zone distance relay for each of said carrier current relayed lines, contact means on said third zone unit of each of said distance relays, each of said distance relays having a substantially directional third zone unit, a control circuit means electrically connected to each of said contact means and connections for electrically connecting said control circuit means to a source of control current to initiate in response to operation of any one of said relays for predetermined electrical fault conditions on said power system the transmission of carrier current signal in all carrier current relayed lines.

6. A backup protection and carrier current relay blocking arrangement for a power system having an electrical bus and at least two power sources and at least two carrier current relayed transmission lines connected thereto and at least one of the power sources being connected to the bus through one of the transmission lines comprising a three-zone distance relay for each carrier current relayed line, each of said distance relays having a substantially directional third zone unit, contact means on the third zone unit of each of the distance relays, a control circuit means electrically connected to each of said contact means and connections for electrically connecting said control circuit means to a source of control current to initiate in response to operation of any one of said relays for predetermined electrical conditions on said power system the transmission of carrier current signal in at least the carrier current relayed line or lines other than the line with which that particular relay is connected.

ANDREW J. McCONNELL.

REFERENCES CITED

The following references are of record in the file of this patent:

UNITED STATES PATENTS

| Number | Name | Date |
|---|---|---|
| 2,398,648 | Kennedy | Apr. 16, 1946 |
| 2,430,871 | Goldsborough | Nov. 18, 1947 |